(12) United States Patent
Liu et al.

(10) Patent No.: US 12,259,344 B1
(45) Date of Patent: Mar. 25, 2025

(54) LIVING CELL MICROBEAM DIRECTIONAL AND QUANTITATIVE IRRADIATION IMAGING APPARATUS AND METHOD

(71) Applicant: Harbin Institute of Technology, Harbin (CN)

(72) Inventors: Chenguang Liu, Harbin (CN); Jian Liu, Harbin (CN); Zhao Chen, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/809,820

(22) Filed: Aug. 20, 2024

(30) Foreign Application Priority Data

Oct. 31, 2023 (CN) .......................... 202311421744.6

(51) Int. Cl.
*G01N 23/2255* (2018.01)
*G01T 1/20* (2006.01)
*G01T 1/29* (2006.01)

(52) U.S. Cl.
CPC ....... *G01N 23/2255* (2013.01); *G01T 1/2006* (2013.01); *G01T 1/2978* (2013.01)

(58) Field of Classification Search
CPC .................................................. G01N 23/2255
USPC ........................................ 250/306, 307, 309
See application file for complete search history.

(56) References Cited

U.S. PATENT DOCUMENTS

| | | | | |
|---|---|---|---|---|
| 7,515,681 | B2* | 4/2009 | Ebstein | G01T 1/29 378/19 |
| 9,937,360 | B1* | 4/2018 | Papeer | A61N 5/1081 |
| 10,525,285 | B1* | 1/2020 | Friedman | A61N 5/1045 |
| 11,717,237 | B2* | 8/2023 | DeJongh | G06T 11/006 250/363.04 |

* cited by examiner

*Primary Examiner* — Allen C. Ho
(74) *Attorney, Agent, or Firm* — Reising Ethington P.C.

(57) ABSTRACT

Provided is a living cell microbeam directional and quantitative irradiation imaging apparatus. The problem that qualitative analysis of the mechanism of action of biological cells irradiated cannot accurately study the mechanism of action of different irradiation doses on biological cells as the cell irradiation technology can be only used to perform qualitative irradiation on living biological cells is solved. The apparatus includes a vertical microbeam terminal, a living cell directional irradiation module, a wide-field microscopic module, a mode switching module, and a single-proton counting and radiation synchronous control module. The vertical microbeam terminal, the living cell directional irradiation module, the mode switching module and the wide-field microscopic module are sequentially matched, the mode switching module is connected to the single-proton counting and radiation synchronous control module, and the vertical microbeam terminal is matched with the single-proton counting and radiation synchronous control module.

12 Claims, 1 Drawing Sheet

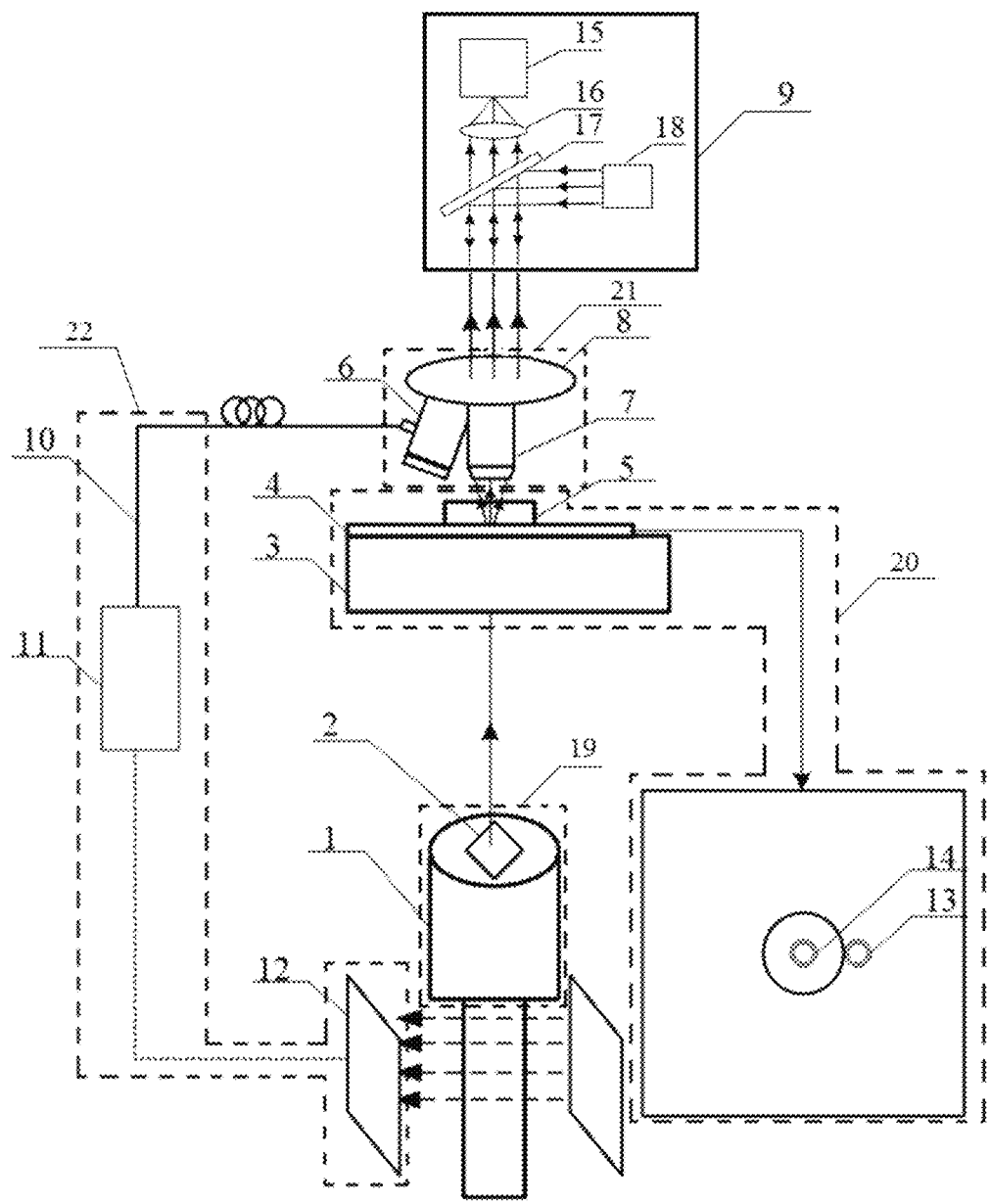

LIVING CELL MICROBEAM DIRECTIONAL AND QUANTITATIVE IRRADIATION IMAGING APPARATUS AND METHOD

CROSS-REFERENCE TO RELATED APPLICATION

This patent application claims the benefit and priority of Chinese Patent Application No. 2023114217446, filed with the China National Intellectual Property Administration on Oct. 31, 2023, the disclosure of which is incorporated by reference herein in its entirety as part of the present application.

TECHNICAL FIELD

The present disclosure relates to a directional and quantitative irradiation apparatus and method, belonging to the cross technical field of radiation biology and photoelectric detection.

BACKGROUND

The living cell microbeam directional and quantitative irradiation imaging apparatus and method have important background and significance in many fields. In the fields of biology and medicines, the effects of radiation on cells and organisms are widely studied. The study of the mechanism of action of the radiation on cells can be conducive to understanding the basic problems of radiation biology, such as DNA repair, cell cycle arrest and cell death. Meanwhile, radiation is also widely used in medical treatment, such as radiotherapy and radiosensitization therapy. Therefore, the living cell microbeam directional and quantitative irradiation imaging apparatus and method can provide a method for accurately controlling radiation dose and irradiation time, which is of great significance for studying the biological effects of radiation on cells and developing new therapeutic strategies.

In the aerospace field, the living cell microbeam directional and quantitative irradiation imaging apparatus can be used in the ground simulation apparatus of space environment to evaluate the influence of radiation on organisms, which can simulate the radiation conditions in space environment on the ground, and carry out experimental research on biological materials and radiation protection materials to evaluate their radiation resistance and cytotoxicological effects. Meanwhile, through the living cell microbeam in-situ quantitative irradiation apparatus and method, the influence of the radiation on the cells and tissues of space organisms can be studied, thus providing basic data and scientific basis for solving space biology problems.

In the field of physics, radiation physics is a subject that studies the interaction between electromagnetic radiation, particle radiation and nuclear radiation. The interaction between microscopic particle beams, such as ion beam and electron beam, and substances is an important research direction. Through the living cell microbeam in-situ quantitative irradiation apparatus and method, the mechanism of action between microscopic particle beams and cells, as well as the physical phenomena such as energy distribution of particle beam deposition in cells, particle scattering and interaction can be studied, which is of great significance for understanding the basic problems of radiation physics and developing new radiation sources and treatment methods.

The problem that qualitative analysis of the mechanism of action of biological cells irradiated cannot accurately study the mechanism of action of different irradiation doses on biological cells as the existing cell irradiation technology can be only used to perform qualitative irradiation on living biological cells is solved.

Therefore, there is an urgent need to provide a living cell microbeam directional and quantitative irradiation imaging apparatus and method, so as to solve the technical problems above.

SUMMARY

An objective of the present disclosure is to solve the problem that qualitative analysis of the mechanism of action of biological cells irradiated cannot accurately study the mechanism of action of different irradiation doses on biological cells as the existing cell irradiation technology can be only used to perform qualitative irradiation on living biological cells, and a living cell microbeam directional and quantitative irradiation imaging apparatus and method are provided. A brief summary of the present disclosure is given below to provide a basic understanding of some aspects of the present disclosure. It should be understood that this brief summary is not an exhaustive summary of the present disclosure, which is not intended to identify key or important parts of the present disclosure, nor is it intended to limit the scope of the present disclosure. The technical solution of the present disclosure is as follows:

A living cell microbeam directional and quantitative irradiation imaging apparatus includes a vertical microbeam terminal, a living cell directional irradiation module, a wide-field microscopic module, a mode switching module, and a single-proton counting and radiation synchronous control module. The vertical microbeam terminal, the living cell directional irradiation module, the mode switching module and the wide-field microscopic module are sequentially matched, the mode switching module is connected to the single-proton counting and radiation synchronous control module, and the vertical microbeam terminal is matched with the single-proton counting and radiation synchronous control module.

Preferably, the vertical microbeam terminal includes a vacuum beam current pipeline, and a vacuum window. The vacuum beam current pipeline is provided with the vacuum window.

Preferably, the living cell directional irradiation module includes a two-dimensional displacement table, a biological sample tray, a living cell culture dish, a first scintillator, and a second scintillator. The biological sample tray is placed on the two-dimensional displacement table, the first scintillator and the second scintillator are arranged on the biological sample tray, and the living cell culture dish is placed on the biological sample tray. The first scintillator and the second scintillator are coaxial with the vacuum window, and the living cell culture dish is placed above the second scintillator in the biological sample tray.

Preferably, the living cell culture dish is a small confocal dish, and a thickness of the bottom of the living cell culture dish is less than 0.17 mm.

Preferably, the mode switching module includes a single-proton counting and collecting apparatus, an electric objective turret, and an objective lens. The single-proton counting and collecting apparatus and the objective lens are arranged on the electric objective turret, and the objective lens is focused on the first scintillator.

Preferably, the single-proton counting and radiation synchronous control module includes a multimode fiber patch cord, a photon counting detector, and a beam current switch.

The single-proton counting and collecting apparatus is connected to the photon counting detector through the multimode fiber patch cord. The photon counting detector is connected to the beam current switch; and a lower portion of the vacuum beam current pipeline is arranged in the beam current switch.

A living cell microbeam directional and quantitative irradiation method includes the following steps:

Step a: outputting a proton beam current through a vacuum window of a vertical microbeam terminal, and moving a first scintillator to the center of the vacuum window of the vertical microbeam terminal through a two-dimensional displacement table;

Step b: adjusting an axial position where an objective lens is located to make the objective lens focused to a surface of a scintillator, adjusting parameters of the vertical microbeam terminal to adjust a beam spot to the center of a field of view, making the beam spot clearly imaged in the field of view of a wide-field camera, and marking a position where the beam spot is located;

Step c: switching off the beam current, moving the two-dimensional displacement table to move a second scintillator and a cell culture dish to a microbeam irradiation area, namely, the center of the vacuum window of the vertical microbeam terminal; switching on a white light source in a wide-field microscopic module, and adjusting the two-dimensional displacement table to move cells to be irradiated to coincide with a central position of the beam spot;

Step d: switching off the white light source in the wide-field microscopic module, controlling an electric objective turret to make a single-proton counting and collecting apparatus aligned with the cells to be irradiated, setting the number of irradiation protons for a photon counting detector, and switching on the beam current, wherein when monitoring that the number of irradiation protons reaches a predetermined value, that is, the number of photon pulses counted by the photon counting detector reaches a set value, a high-speed digital IO (input/output) port of the photon counting detector generates a high level, and the high level is fed to a beam current switch; and Step e: after the beam current switch receives a high level signal, generating a high-voltage bias voltage to deflect a proton beam, and switching off the beam current to complete living cell microbeam directional and quantitative irradiation.

The present disclosure has the beneficial effects that:

Accurate quantitative and directional irradiation of living biological cells can be achieved, thus studying the quantitative influence of radiation on cells better. The apparatus and method can be used to accurately study the mechanism of action of different irradiation doses on biological cells, and have important application values and significance in multiple disciplines such as biology, medicines, and physics.

BRIEF DESCRIPTION OF THE DRAWINGS

FIG. 1 is a structural diagram of a living cell microbeam directional and quantitative irradiation imaging apparatus.

In the drawings: 1—vacuum beam current pipeline; 2—vacuum window; 3—two-dimensional displacement table; 4—biological sample tray; 5—living cell culture dish; 6—single-proton counting and collecting apparatus; 7—objective lens; 8—electronic objective turret; 9—wide-field microscopic module; 10—multimode fiber patch cord; 11—photon counting detector; 12—beam current switch; 13—first scintillator; 14—second scintillator; 15—wide-field camera; 16—tube lens; 17—spectroscope; 18—white light source; 19—vertical microbeam terminal; 20—living cell directional irradiation module; 21—mode switching module; 22—single-proton counting and radiation synchronous control module.

DETAILED DESCRIPTION OF THE EMBODIMENTS

To make objectives, technical solutions and advantages of the present disclosure more clearly, the present disclosure is described in detail below with reference to specific embodiments shown in the accompanying drawings. It should be understood that these descriptions are only exemplary and are not intended to limit the scope of the present disclosure. In addition, in the following description, the description of well-known structures and technologies are omitted to avoid unnecessarily confusing the concepts of the present disclosure.

For the convenience of illustration, if "up", "down", "left", "right" and the other in the present disclosure only indicate that they are consistent with the up, down, left and right directions of the drawing itself, and are not intended to limit the structure, which are only for convenience of description of the present disclosure and simplification of description rather than indicating or implying that the device or element referred to must have a particular orientation, be constructed and operate in a particular orientation, and thus are not to be construed as limiting the present disclosure.

Terminology explanation part: the terms "install", "connected", "connection", "fix", and the like should be understood broadly, e.g., a fixed connection, a detachable connection, or an integrated connection; a mechanical connection, or an electrical connection; a direct connection or an indirect connection through an intermediate medium; an internal communication between the two elements or interactions between the two elements. For those skilled in the art, the specific meanings of the above terms in the present invention can be understood according to specific situations.

Specific embodiment 1: this embodiment is described in conjunction with FIG. 1, a living cell microbeam directional and quantitative irradiation imaging apparatus includes a vertical microbeam terminal, a living cell directional irradiation module, a wide-field microscopic module, a mode switching module, and a single-proton counting and radiation synchronous control module. The vertical microbeam terminal, the living cell directional irradiation module, the mode switching module and the wide-field microscopic module 9 are sequentially matched, the mode switching module is connected to the single-proton counting and radiation synchronous control module, and the vertical microbeam terminal is matched with the single-proton counting and radiation synchronous control module. Accurate quantitative and directional irradiation of living biological cells can be achieved, thus studying the quantitative influence of radiation on cells better. The apparatus and method can be used to accurately study the mechanism of action of different irradiation doses on biological cells, and have important application values and significance in multiple disciplines such as biology, medicines, and physics.

Specific embodiment 2: this embodiment is described in conjunction with FIG. 1, the vertical microbeam terminal of the living cell microbeam directional and quantitative irradiation imaging apparatus includes a vacuum beam current pipeline 1, and a vacuum window 2. The vacuum beam current pipeline 1 is provided with the vacuum window 2 to generate a living cell irradiation proton. The vertical microbeam terminal emits a proton beam current through the vacuum window, the high-precision two-dimensional displacement table can move the sample tray to make a first scintillator 13 and a second scintillator 14 aligned with the vacuum window of the microbeam terminal, respectively.

Specific embodiment 3, this embodiment is described in conjunction with FIG. 1, the living cell directional irradiation module of the living cell microbeam directional and quantitative irradiation imaging apparatus includes a two-dimensional displacement table 3, a biological sample tray 4, a living cell culture dish 5, a first scintillator 13, and a second scintillator 14. The first scintillator 13 and the second scintillator 14 are both round. The biological sample tray 4 is placed on the high-precision two-dimensional displacement table 3, the first scintillator 13 and the second scintillator 14 are arranged on the biological sample tray 4, and the living cell culture dish 5 is placed on the biological sample tray 4. The first scintillator 13 and the second scintillator 14 are aligned and coaxial with the vacuum window 2 through the two-dimensional displacement table 3, that is, the first scintillator is firstly aligned with the vacuum window to determine a position of a beam spot, and then the second scintillator is aligned with the vacuum window through the two-dimensional displacement table to prepare to irradiate cells. The living cell culture dish 5 is placed above a position of the second scintillator 14 in the biological sample tray 4, the first scintillator 13 is not arranged below the living cell culture dish 5, and the living cell culture dish 5 and the second scintillator 14 are coaxially arranged, such that the second scintillator 14 is aligned with target cells. The vertical microbeam terminal emits the proton beam current through the vacuum window, and the high-precision two-dimensional displacement table can move the sample tray to make the first scintillator 13 and the scintillator 14 aligned with the vacuum window of the microbeam terminal, respectively.

Specific embodiment 4, this embodiment is described in conjunction with FIG. 1, the living cell culture dish 5 of the living cell microbeam directional and quantitative irradiation imaging apparatus is a small confocal dish, and a thickness of the bottom of the living cell culture dish 5 is less than 0.17 mm.

Specific embodiment 5, this embodiment is described in conjunction with FIG. 1, the mode switching module of the living cell microbeam directional and quantitative irradiation imaging apparatus includes a single-proton counting and collecting apparatus 6, an electric objective turret 8, and an objective lens 7. The single-proton counting and collecting apparatus 6 and the objective lens 7 are arranged on the electric objective turret 8, and the objective lens 7 is focused to the first scintillator 13. When the objective lens 7 is focused to the first scintillator 13, the position of the beam spot can be determined only through the first scintillator, and the second scintillator does not need to be focused by the objective lens, and is used to generate a light pulse to be detected by the detector when the proton beam passes through the second scintillator. The beam spot generated by the proton beam when passing through the scintillator is observed through the wide-field microscopic module 9, and a position where the beam spot is located can be marked. The electric objective turret 8 can switch the objective lens 7 and the single-proton counting and collecting apparatus 6, and switch a microscope and the single-proton counting and collecting apparatus. The wide-field microscopic module 9 includes a wide-field camera, a white light source, a spectroscope, and a tube lens, and is configured to monitor the position and size of the beam spot.

Specific embodiment 6, this embodiment is described in conjunction with FIG. 1, the single-proton counting and radiation synchronous control module of the living cell microbeam directional and quantitative irradiation imaging apparatus includes a multimode fiber patch cord 10, a photon counting detector 11, and a beam current switch 12. A reflective collimator lens of the single-proton counting and collecting apparatus 6 is connected to the photon counting detector 11 through the multimode fiber patch cord 10, and the photon counting detector 11 is connected to the beam current switch 12. The beam current switch 12 has two polar plates, a lower portion of the vacuum beam current pipeline 1 is arranged between the two polar plates of the beam current switch. The photon counting detector 11 is configured to count the number of photon pulses which has reached a set number of irradiation protons. And a high-speed digital IO port of the photon counting detectors generates a high level to fed to the beam current switch 12. The single-proton counting and collecting apparatus 6 includes a collecting lens and a reflective collimator lens arranged coaxially. The collected photon pulse of the proton excited by the scintillator is transmitted to the photon counting detector 11 via the multimode fiber patch cord 10 with a linear core diameter of 1000 μm. The beam current switch 12, after receiving a high-level signal, generates a high-voltage bias voltage to deflect the proton beam, and then the beam current is switched off. The single-proton counting and radiation synchronous control module adopted in the apparatus can achieve accurate and quantitative irradiation of living cells.

Specific embodiment 7, this embodiment is described in conjunction with FIG. 1, a living cell microbeam directional and quantitative irradiation imaging method employs the of the living cell microbeam directional and quantitative irradiation imaging apparatus, and includes the following steps:

Step a. A vacuum window 2 of a vertical microbeam terminal outputs a proton beam current, a first scintillator 13 is moved by a two-dimensional displacement table 3 to the center of the vacuum window 2 of the vertical microbeam terminal. Through the two-dimensional placement table, cells to be irradiated can be accurately moved to the center of the beam current, thus achieving irradiation at cell and subcellular level.

Step b. An axial position where an objective lens 7 is located is adjusted to make the objective lens 7 focused to a surface of the first scintillator, and parameters of the vertical microbeam terminal are adjusted to adjust a beam spot to the center of a field of view, such that the beam spot can be clearly imaged in the field of view of the wide-field camera, and a position wherein the beam spot is located is marked.

Step c. The beam current is switched off, the two-dimensional displacement table (3) is moved to move a second scintillator 14 and a cell culture dish 5 to a microbeam irradiation region, i.e., the center of the vacuum window 2 of the vertical microbeam terminal. A white light source in a wide-field microscopic module 9 is switched on, and the two-dimensional displacement table 3 is finely adjusted to move cells to be irradiated in the living cell culture dish to coincide with a central position of the beam spot (the marked position where the beam spot is located). The beam current is switched on/off through the beam current switch, a counting board feeds a high level to switch off the beam current, and feeds a low level to switch on the beam current.

Step d. The white light source in the wide-field microscopic module 9 is switched off, an electric objective turret 8 is controlled to make a single-proton counting and collecting apparatus 6 aligned with the cells to be irradiated, the number of irradiation photons is set for the photon counting detector 11, and the beam current is switched on. When monitoring that the number of irradiation protons reaches a predetermined value, that is, the number of photon pulses counted by the photon counting detector 11 reaches a set value, a high-speed digital IO (input/output) port of the photon counting detector generates a high level, and the high level is fed to a beam current switch 12.

Step e. The beam current switch 12, after receiving a high level signal, generates a high-voltage bias voltage to deflect the proton beam. The beam current is switched off to complete the living cell microbeam directional and quantitative irradiation. The radiation dose can be accurately controlled. The quantitative irradiation can accurately control the radiation dose of irradiation, so as to study the quantitative influence of radiation on cells and achieve accurate, quantitative and directional irradiation on living cells. Quantitative analysis of cell survival rate is as follows: the cell survival rate can be quantitatively analyzed through quantitative irradiation, thus understanding the killing effect of radiation on cells better. The study of the reaction of different cell types is as follows: quantitative irradiation can study the reaction of different cell types, thus understanding the sensitivity of different cell types to radiation better.

It should be noted that in the above embodiments, the technical solutions can be arranged and combined as long as they are not contradictory. Those skilled in the art can exhaust all possibilities according to the mathematical knowledge of arrangement and combination, and thus the technical solutions after arrangement and combination will not be explained one by one in the present disclosure, but it should be understood that the technical solutions after arrangement and combination have been disclosed in the present disclosure.

The above is only the preferred embodiment of the present disclosure, and is not used to limit the present disclosure. For those skilled in the art, the present disclosure may have various modifications and changes. Any modification, equivalent substitution, improvement, etc. made within the spirit and principle of the present disclosure should be included in the scope of protection of the present disclosure.

What is claimed is:

1. A living cell microbeam directional and quantitative irradiation imaging apparatus, comprising:
    a vertical microbeam terminal,
    a living cell directional irradiation module,
    a wide-field microscopic module including a wide-field camera,
    a mode switching module, and
    a single-proton counting and radiation synchronous control module,
    wherein the vertical microbeam terminal, the living cell directional irradiation module, the mode switching module, and the wide-field microscopic module are sequentially matched, the mode switching module is connected to the single-proton counting and radiation synchronous control module, and the vertical microbeam terminal is matched with the single-proton counting and radiation synchronous control module.

2. The living cell microbeam directional and quantitative irradiation imaging apparatus according to claim 1, wherein the vertical microbeam terminal comprises a vacuum beam current pipeline and a vacuum window; and the vacuum beam current pipeline is provided with the vacuum window.

3. The living cell microbeam directional and quantitative irradiation imaging apparatus according to claim 2, wherein the living cell directional irradiation module comprises a two-dimensional displacement table, a biological sample tray, a living cell culture dish, a first scintillator, and a second scintillator; the biological sample tray is placed on the two-dimensional displacement table, the first scintillator and the second scintillator are arranged on the biological sample tray, the living cell culture dish is placed on the biological sample tray, the first scintillator and the second scintillator are coaxial with the vacuum window, and the living cell culture dish is placed above the second scintillator in the biological sample tray.

4. The living cell microbeam directional and quantitative irradiation imaging apparatus according to claim 3, wherein the living cell culture dish is a small confocal dish, and a thickness of a bottom of the living cell culture dish is less than 0.17 mm.

5. The living cell microbeam directional and quantitative irradiation imaging apparatus according to claim 3, wherein the mode switching module comprises a single-proton counting and collecting apparatus, an electric objective turret, and an objective lens; the single-proton counting and collecting apparatus and the objective lens are arranged on the electric objective turret, and the objective lens is focused on the first scintillator.

6. The living cell microbeam directional and quantitative irradiation imaging apparatus according to claim 5, wherein the single-proton counting and radiation synchronous control module comprises a multimode fiber patch cord, a photon counting detector, and a beam current switch; the single-proton counting and collecting apparatus is connected to the photon counting detector through the multimode fiber patch cord; the photon counting detector is connected to the beam current switch; and a lower portion of the vacuum beam current pipeline is arranged in the beam current switch.

7. A living cell microbeam directional and quantitative irradiation method, wherein the living cell microbeam directional and quantitative irradiation imaging apparatus according to claim 1 is adopted, and the method comprises the following steps:
    Step a: outputting a proton beam current through a vacuum window of a vertical microbeam terminal, and moving a first scintillator to a center of the vacuum window of the vertical microbeam terminal through a two-dimensional displacement table;
    Step b: adjusting an axial position, where an objective lens is located to make the objective lens focused to a surface of the first scintillator, adjusting parameters of the vertical microbeam terminal to adjust a beam spot to a center of a field of view, making the beam spot clearly imaged in the field of view of the wide-field camera, and marking a position where the beam spot is located;
    Step c: switching off the proton beam current, moving the two-dimensional displacement table to move a second scintillator and a living cell culture dish to a microbeam irradiation area, namely, the center of the vacuum window of the vertical microbeam terminal; switching on a white light source in the wide-field microscopic module, and adjusting the two-dimensional displacement table to move cells to be irradiated to coincide with a central position of the beam spot;

Step d: switching off the white light source in the wide-field microscopic module, controlling an electric objective turret to make a single-proton counting and collecting apparatus aligned with the cells to be irradiated, setting a number of irradiation protons of a photon counting detector, and switching on the proton beam current, wherein when monitoring that the number of irradiation protons reaches a predetermined value, that is, a number of photon pulses counted by the photon counting detector reaches a set value, a high-speed digital IO (input/output) port of the photon counting detector generates a high level signal, and the high level signal is fed to a beam current switch; and Step e: after the beam current switch receives a high level signal, generating a high-voltage bias voltage to deflect a proton beam, and switching off the proton beam current to complete a living cell microbeam directional and quantitative irradiation.

8. The living cell microbeam directional and quantitative irradiation method according to claim 7, wherein the vertical microbeam terminal comprises a vacuum beam current pipeline and a vacuum window; and the vacuum beam current pipeline is provided with the vacuum window.

9. The living cell microbeam directional and quantitative irradiation method according to claim 8, wherein the living cell directional irradiation module comprises a two-dimensional displacement table, a biological sample tray, a living cell culture dish, a first scintillator, and a second scintillator; the biological sample tray is placed on the two-dimensional displacement table, the first scintillator and the second scintillator are arranged on the biological sample tray, the living cell culture dish is placed on the biological sample tray, the first scintillator and the second scintillator are coaxial with the vacuum window, and the living cell culture dish is placed above the second scintillator in the biological sample tray.

10. The living cell microbeam directional and quantitative irradiation method according to claim 9, wherein the living cell culture dish is a small confocal dish, and a thickness of a bottom of the living cell culture dish is less than 0.17 mm.

11. The living cell microbeam directional and quantitative irradiation method according to claim 9, wherein the mode switching module comprises a single-proton counting and collecting apparatus, an electric objective turret, and an objective lens; the single-proton counting and collecting apparatus and the objective lens are arranged on the electric objective turret, and the objective lens is focused on the first scintillator.

12. The living cell microbeam directional and quantitative irradiation method according to claim 11, wherein the single-proton counting and radiation synchronous control module comprises a multimode fiber patch cord, a photon counting detector, and a beam current switch; the single-proton counting and collecting apparatus is connected to the photon counting detector through the multimode fiber patch cord; the photon counting detector is connected to the beam current switch; and a lower portion of the vacuum beam current pipeline is arranged in the beam current switch.

* * * * *